United States Patent [19]
Grieco

[11] Patent Number: 6,067,897
[45] Date of Patent: May 30, 2000

[54] APPARATUS FOR PRODUCING A DOUGH DISK

[76] Inventor: Leonardo Grieco, Via Giulio Cesare 2, 21050 Saltrio, Italy

[21] Appl. No.: 09/161,646

[22] Filed: Sep. 28, 1998

[30] Foreign Application Priority Data

Sep. 29, 1997 [CH] Switzerland .............................. 2280/97

[51] Int. Cl.[7] .............................. A21C 3/02; A21C 11/00
[52] U.S. Cl. .............................. 99/353; 99/432; 99/450.1; 425/337; 425/367
[58] Field of Search .............................. 99/349, 352–355, 99/450.1–450.5, 494, 432, 372, 373; 426/496, 512; 425/337, 367, 429, 112, 397, 406, 394, 412; 74/84 R; 100/156, 210, 177, 178

[56] References Cited

U.S. PATENT DOCUMENTS

| | | |
|---|---|---|
| 3,390,645 | 7/1968 | Pacilio . |
| 4,036,164 | 7/1977 | Kowach et al. . |
| 4,636,164 | 1/1987 | Bellotto et al. . |
| 4,690,043 | 9/1987 | Pacilio . |
| 4,838,153 | 6/1989 | Escamilla et al. .......................... 99/349 |
| 5,388,503 | 2/1995 | Buerkle ...................................... 99/349 |
| 5,417,149 | 5/1995 | Raio et al. ............................ 425/394 X |
| 5,469,779 | 11/1995 | Amore et al. .......................... 99/353 X |
| 5,546,850 | 8/1996 | Zaveri ................................... 100/210 X |
| 5,649,473 | 7/1997 | Lawrence ............................... 99/353 X |
| 5,918,533 | 7/1999 | Lawrence et al. ................... 425/310 X |
| 5,921,170 | 7/1999 | Khatchadourian et al. ....... 99/450.1 X |
| 5,937,739 | 8/1999 | Schultz ................................... 99/353 X |

FOREIGN PATENT DOCUMENTS

| | | |
|---|---|---|
| 0069078 | 1/1983 | European Pat. Off. . |
| 4343065 | 7/1995 | Germany . |
| 96/28979 | 9/1996 | WIPO . |

*Primary Examiner*—Timothy Simone
*Attorney, Agent, or Firm*—Greenblum & Bernstein, P.L.C.

[57] ABSTRACT

Method and apparatus for producing a disk of pizza dough ready for filling and baking using centrifugal force. Expanding of pizza dough under the influence of the centrifugal force is known, and the pizzaiolo applies such force by twirling a disk of dough overhead in a the room for expanding its diameter. Other known mechanical systems for this purpose provide very complicated devices equipped with radially oscillating levers which guide the dough in its radial expansion. According to the present invention the expansion of the diameter of the disk of dough under the influence of the centrifugal force is effected using an apparatus of very simple design including two plates arranged coaxial, one supported by the other. According to the method, the dough is prepared first as a preliminary disk of dough, the diameter of which ranges between a third to one half of the desired final diameter of the dough disk, and this preliminary disk is subjected to the influence of the centrifugal force in a chamber formed on both sides by two rotating planar surfaces. The great simplicity of the apparatus realizing the present invention permits its large scale application in every small pizzeria.

16 Claims, 3 Drawing Sheets

APPARATUS FOR PRODUCING A DOUGH DISK

CROSS-REFERENCE TO RELATED APPLICATION

The present application claims priority under 35 U.S.C. 119 of Swiss Patent Application No. 1997 2280/97, filed Sep. 29, 1997, the disclosure of which is expressly incorporated by reference herein in its entirety.

BACKGROUND OF THE INVENTION

1. Field of the Invention

The present invention concerns a method for producing a disk of pizza dough ready to be topped and baked, and an apparatus for implementing the method.

2. Discussion of Background Information

In manually processing pizza dough, for which a leavened dough is used for obtaining the softness desired, it is known that the pizzaiolo (pizza baker) starts with a ball of kneaded dough which he flattens pressing it lightly between his hands in order to get a rather thick disk of a thickness of the order of centimeters and of a diameter much smaller than the desired final diameter and then applying skillful manipulations beating the dough, and above all twirling it in the air, expands the disk to the final diameter. In this operation the centrifugal force plays a fundamental role as the enlargement of the disk is effected to a large extent under the influence of this force generated by the rotation of the disk about a virtual rotational axis. This traditional manner of processing the pizza dough renders the dough excellently thin and soft in such a manner that, after baking, optimum characteristics of the finished product required by the market are ensured. The manual method of producing pizza dough thus is ideal and practically cannot be further improved. The manual method, however, presents a basic disadvantage insofar as a degree of manual skill is required of the pizzaiolo which very rarely is found and thus one is compelled to put up with insufficiently trained pizza bakers, and the poor quality results can easily be imagined.

Moreover, the process of manually expanding the dough, certainly spectacular as such, is time consuming and thus the hourly production of a pizzaiolo (pizza baker) is limited which results in an elevated price for the finished product.

For these reasons, in practical use and in the patent literature numerous proposals have become known for replacing the manual processing method of the pizzaiolo by a mechanized production of the pizza dough. These proposals can be grouped into two distinct categories. In one category, there are the (numerous) proposals based on the general idea of pressing the dough into a mold squeezing it from the inner area towards the outer area. It is to be stated right away that a system of this type cannot yield good results, even if such devices have been realized, and thus for this reason a further description can be dispensed with. Actually, subjecting the dough to high pressure implies that all the small air bubbles formed in the dough during the leavening process are eliminated. Leavening actually just is aimed at softening the dough composed of water, flour and salt, which otherwise would remain compact, by favoring the formation of small air bubbles in it. Evidently extending systems in which the leavened dough is compressed strongly also compress the micro cavities therein and squeezes the air out of the dough. From an operation of this type, a compacted dough results which is not pleasant tasting when eaten, and thus is not esteemed.

Examples of devices working in the manner mentioned are found in the literature in great numbers. For example, DE-A-4343065 discloses operation with a piston, and U.S. Pat. No. 4,636,164 is equipped with a double row of calender rolls, as well as EP-A-0069078 in which calendering and pressing can be considered essentially equivalent under the aspect of the scope of the present invention as both processes are based on the application of forces pressing perpendicularly relative to the dough to be expanded, Furthermore, WO-96/28979 discloses expansion of the disk of dough from the inner area towards the outer area with the help of a complicated system of pressing segments arranged concentrically which successively are pressed, beginning with the innermost segments nearest to the center and finally the outermost segments are pressed in such a manner that the expansion of the dough is performed by compression from the inner area towards the outermost area. In addition to the great complexity of the design of this device, this system also presents the inherent disadvantages of the compression systems mentioned above.

According to the second category of proposals which are less numerous and which start out from the manual processing system, it is tried to effect the radial expansion of the dough under application of centrifugal force, i.e. by rotating the dough about a rotational axis extending at right angles relative to the disk of dough. These systems thus try to imitate the performance of the pizzaiolo (pizza baker) and indeed the results obtained in this manner are satisfactory as the small bubbles present in the dough before it is expanded into a soft disk remain present and lend the dough the desired degree of softness.

A proposal in this direction is described in U.S. Pat. No. 3,390,645, taken up and improved by the same applicant in U.S. Pat. No. 4,690,043. According to this proposal, the dough is rotated within a room limited radially by a system of tapes held by an arrangement of levers which can perform radial movements. The concept applied here for expanding the pizza dough into a soft disk using the influence of the centrifugal force certainly is correct even if the complexity of the device laid out for this purpose is apt to give room to serious doubts concerning its ease of operation and its operating cost as well as its maintenance cost.

SUMMARY OF THE INVENTION

It is the object of the present invention to propose a method for producing a disk of pizza dough with the help of an application of centrifugal force as described in the two last-mentioned documents but eliminating the disadvantages of the known method, i.e., to be able to apply an apparatus of simple design, and which is of low cost and easy to operate and to maintain.

The present invention is based on the basic concept that the optimum preparation of a disk of pizza dough under application of centrifugal force for obtaining a "web" of well leavened dough the centrifugal force is to be applied during the final stage of production, but for facilitating the application of the force without the help of complicated mechanisms a preliminary disk of dough must be prepared, the diameter of which corresponds to one third to one half of the final diameter, which preliminary disk can be prepared in any way, be it according to traditional methods, i.e. manually, or mechanically e.g. by doubling it using a device, such as described, for example, in EP-A-0069078 cited above. Experience has proven that surprisingly a preliminary disk of the type described can be expanded to larger diameters applying centrifugal force in a most simple manner if it is subject to the force in a chamber essentially limited on either side by two planar surfaces of circular shape and rotating coaxially with the axis of the preliminary disk in which arrangement the distance between the two surfaces in the center area at any time is substantially equal to the thickness of the current thickness of the dough disk. Expressed in other words, it has been found that the influence of centrifugal force on a preliminary disk of leavened pizza dough is effected optimally in such a manner that uniform expansion of the diameter of the preliminary disk is induced until the final disk is obtained, if the preliminary disk subject to the centrifugal force is confined in axial direction between two "guide" surfaces which hold it axially and facilitate its radial expansion in which arrangement the surfaces do not have to be provided with particular means for effecting the radial expansion. These findings have permitted realization of an apparatus of very simple design and of low cost which brings mechanized production of the pizza dough disks into the reach of any pizza restaurant (pizzeria), however small and modest, freeing it of the requirement of hiring specialist personnel.

Thus, in one aspect, the present invention is directed to a method for producing a disk of pizza dough ready to be topped and baked by application of centrifugal force to the disk of dough, comprising flattening a ball of leavened and kneaded dough of predetermined weight in a radial direction to obtain a preliminary dough disk of a diameter (d) ranging from one third to one half of a final diameter (D) desired of the dough disk; and rotating the preliminary dough disk about an axis of symmetry extending at substantially right angles relative to the preliminary dough disk in a chamber which is substantially confined by two circular planar surfaces which are coaxially rotatably arranged with the axis of symmetry of the preliminary dough disk, with a distance between the two planar surfaces, at least in a central area of the two planar surfaces, being substantially equal to a current thickness of the dough disk.

In another aspect, the present invention is directed to apparatus for producing a disk of pizza dough ready to be topped and baked by application of centrifugal force to the disk of dough, comprising a first rotatable plate capable of receiving a disk of dough; a motor adapted to rotate the first plate; a second plate coaxially arranged with the first plate; and a rotatable and suspending support member arranged to rotatably suspend the second plate such that as an axial distance between the first plate and the second plate is decreased, the support member moves towards the first plate.

In still another aspect, the present invention is directed to apparatus for producing a disk of pizza dough ready to be topped and baked by application of centrifugal force to the disk of dough, comprising a first lower rotatable plate capable of receiving a disk of dough, the first plate being rotatable about an axis of symmetry and forming a fixed portion of a chamber; a motor adapted to rotate the first plate; a second plate coaxially arranged with the first plate; a rotatable and suspending support member arranged on the axis of symmetry of the second plate and rotatably suspending the second plate, the support member being arranged such that as an axial distance between the first plate and the second plate is decreased, the support member moves towards the first plate.

In the various aspects of the invention, various modifications can be made thereto, including the variations discussed below.

The distance between the two rotatable planar surfaces in a radially outermost area can be greater than the distance in the central area of the two rotatable planar surfaces.

The distance between the two rotatable planar surfaces can be substantially constant in a circular central area of the planar surfaces corresponding approximately to the diameter (d) of the preliminary dough disk, and then increase linearly towards a radially outermost area of the two planar surfaces.

The preliminary dough disk can be set into rotation at a rotational speed ranging from 250 to 1000 rpm, preferably at a rotational speed ranging from 500 to 700 rpm.

The two planar surfaces can terminate radially in a surface arranged at right angles to the one planar surface and pointing towards the other planar surface forming a circular rim against which the dough disk can rest as the dough disk expands and folds up in an axial direction to form a heightened rim of the final disk of dough. In particular, the one planar surface can comprise a lower planar surface, and the surface can be upwardly arranged at substantially right angles to the one planar surface pointing towards the other planar surface.

The second plate can be capable of being set into motion by the disk of dough which is set into motion by said first plate.

The support member can allow limited lateral pivoting movement of the second disk about a rotational axis. The support member can comprise a spherical link member or a pivotable bearing with beveled rolls.

The second plate can include a planar central area extending at right angles relative to the axis of symmetry and parallel to the first plate comprising a diameter ranging between one third and one half of the diameter of the first plate, and the second plate can include a circular outer area having an increasing distance from the first plate with increasing radial distance from the axis of symmetry.

The support member can be attached to a pivoting lever which is pivotable about a pivoting point arranged at one end, the pivoting lever enabling the second plate to be lowered from a rest position, in which the second plate is raised and provides free access to the surface of the first plate, to a lowered working position, in which the surfaces of the two plates are substantially parallel. Moreover, an actuating cam can be associated with the pivoting point, and an electrical switch can be operable by the actuating cam for starting and stopping the motor to rotate the first plate, respectively, as the pivoting lever is lowered into the working position, and is lifted off the working position.

The first plate can include a circumference and a rim along the circumference, the rim being angled upwardly in an axial direction towards the second plate, and the rim can limit radial expansion of the disk of dough and force the dough to rise to form a rim.

The process and apparatus can further comprise a control device capable of continuously varying rotational speed of the motor. Moreover, the process and apparatus can comprise a timer for controlling and pre-setting duration of rotation of the motor.

The second plate can be composed of a transparent material.

The first plate and the second plate can have diameters ranging from about 30 to 50 cm. Moreover, the first and second plates can be exchangeable, such as exchangeable with variously sized plates to adapt to disks of dough of different sizes.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

Figure 1:
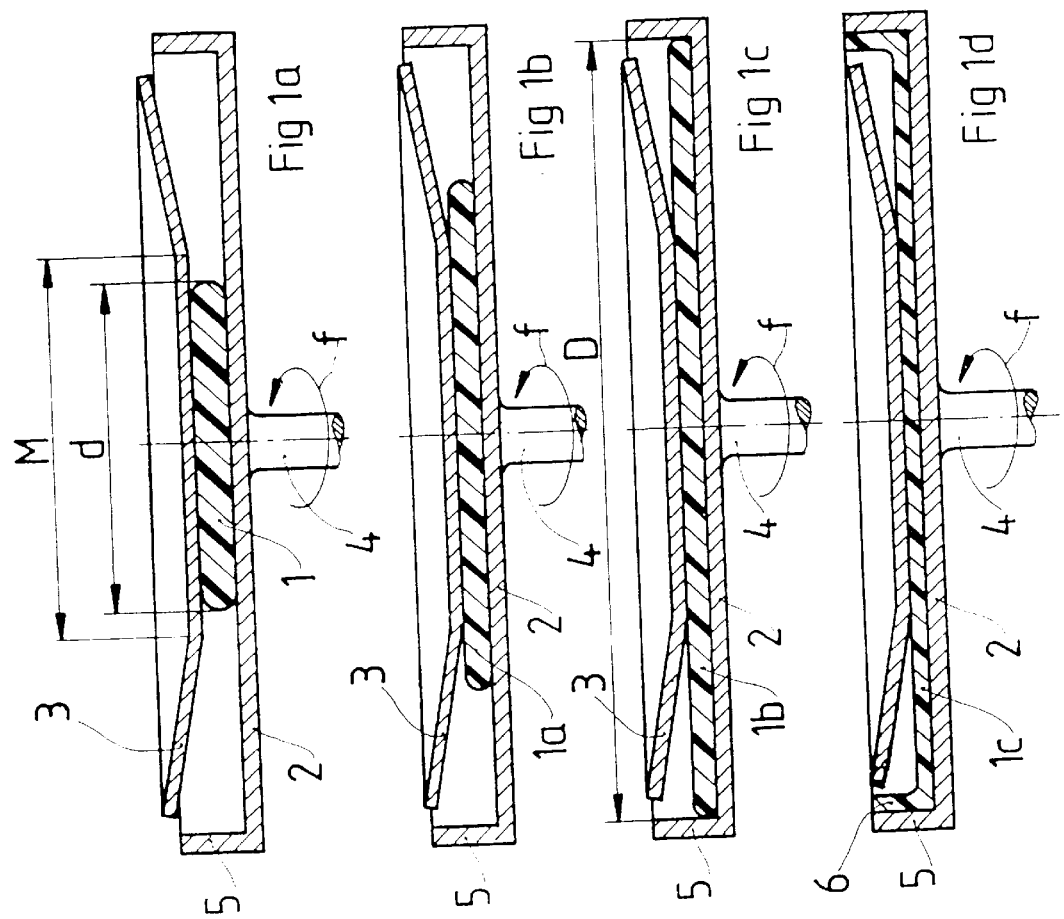
FIGS. 1a–1d illustrate a sequence of operating steps according to the inventive method in an apparatus shown schematically, with design elements for realizing the present invention only being shown.

In FIGS. 1a–1d, the inventive operating phases are indicated. In FIG. 1a, a preliminary dough disk 1 of a diameter d ranging between one third and one half of the desired final diameter D (FIG. 1c) of the dough disk is shown. The preliminary dough disk 1 is prepared from a ball of leavened and kneaded dough of a predetermined weight which then has been flattened radially be it manually, adopting the processing manner applied by the pizzaiolo (pizza baker), or by laminating the ball of dough in order to form a preliminary disk of dough using a mechanical device such as described, for example, in the EP-A-0069078, which is incorporated by reference in its entirety.

The preliminary dough disk 1 is placed at the center of a first lower plate 2 and above the lower plate 2 onto the disk of dough 1 a second upper plate 3 is "deposited" coaxial with the lower plate 2, and suspended above the latter. The plate 3 thus leans on the preliminary disk of dough just with its own weight without any further pressure from the outside. Then the lower plate 2 is set into rotation with which the preliminary disk of dough thus is subject to a centrifugal force in a chamber confined by the two plates 2 and 3 and tends to expand radially so that its diameter is increased. The arrow indicates the rotation of the lower plate 2 about the axle of rotation 4 which rotation is transmitted via the disk of dough 1 to the upper plate 3 which in turn rotates about its axis of symmetry.

In FIG. 1b, an intermediate processing step of the formation of the pizza dough disk is shown in which the disk has begun to expand compared to the preliminary disk of the diameter d, but has not yet reached its final diameter D. It can be seen how the upper plate 3 freely leans on the disk of dough 1 by which it is set into rotation and which tends to approach the lower plate 2 as the thickness of the disk of dough 1–1c decreases in which arrangement the distance between the two limiting plates 2 and 3 remains, at least in its central area, essentially equal to the current thickness of the disk of dough 1–1c.

The upper disk 3 can be substantially planar. Experience has proven, however, that still better results are obtained if the distance between the two rotating surfaces of the plates 2 and 3 is larger at the radially outer area compared to the one prevailing at the central area. As shown in FIGS. 1a–1c, the distance between the two rotating surfaces of the plates 2 and 3 is constant in the central circular area of the plates (up to the diameter M) core corresponding approximately to the diameter d of the preliminary disk of dough 1 (i.e. M=d, FIG. 1a) and then increases towards the radial end of the surfaces. This solution has proven to be still more advantageous as it favors the escape of the air as the dough expands radially.

In FIG. 1c, it can be seen that the disk of dough 1b has reached the outer limit determined radially by a rim 5 of the lower plate 2 which points towards the other disk 3. If the rotation of the plate 2, and consequently also of the plate 3, now is stopped the disk of dough at the end of the process will be of the diameter D and will lack a heightened rim as it should be kept in mind that the dough no longer subject to the influence of the centrifugal force tends to retract radially over a certain distance in such a manner that its final diameter forcibly results somewhat smaller than D. This retracting is caused by the elastic properties of the dough. The measure of this retracting tendency can be judged on the basis of practical experience.

If the rotation of the lower plate 2 is not stopped after the disk of dough has reached the rim 5 of the lower plate 2, the disk of dough 1c will keep expanding (FIG. 1d) but as it cannot increase in diameter further the dough tends to climb along the rim 5 of the lower plate 2. In this manner, a rim of dough 15 is formed which, if desired, can form a heightened rim of the finished pizza.

The rotational speed of the plates 2 and 3 and the duration of the process to be chosen depend on many factors such as the final diameter of the disk of dough desired, the desired physical characteristics (density, plasticity, etc.) which preferentially all are determined experimentally. Practical experience has shown that the rotational speeds of the lower plate 2 and thus practically also of the upper plate 3 range between 250 and 1000 rpm, and preferably between 500 and 700 rpm for dough presenting conventional physical properties. The duration of the process this is chosen very short and is of the order of a few seconds.

Figure 2:
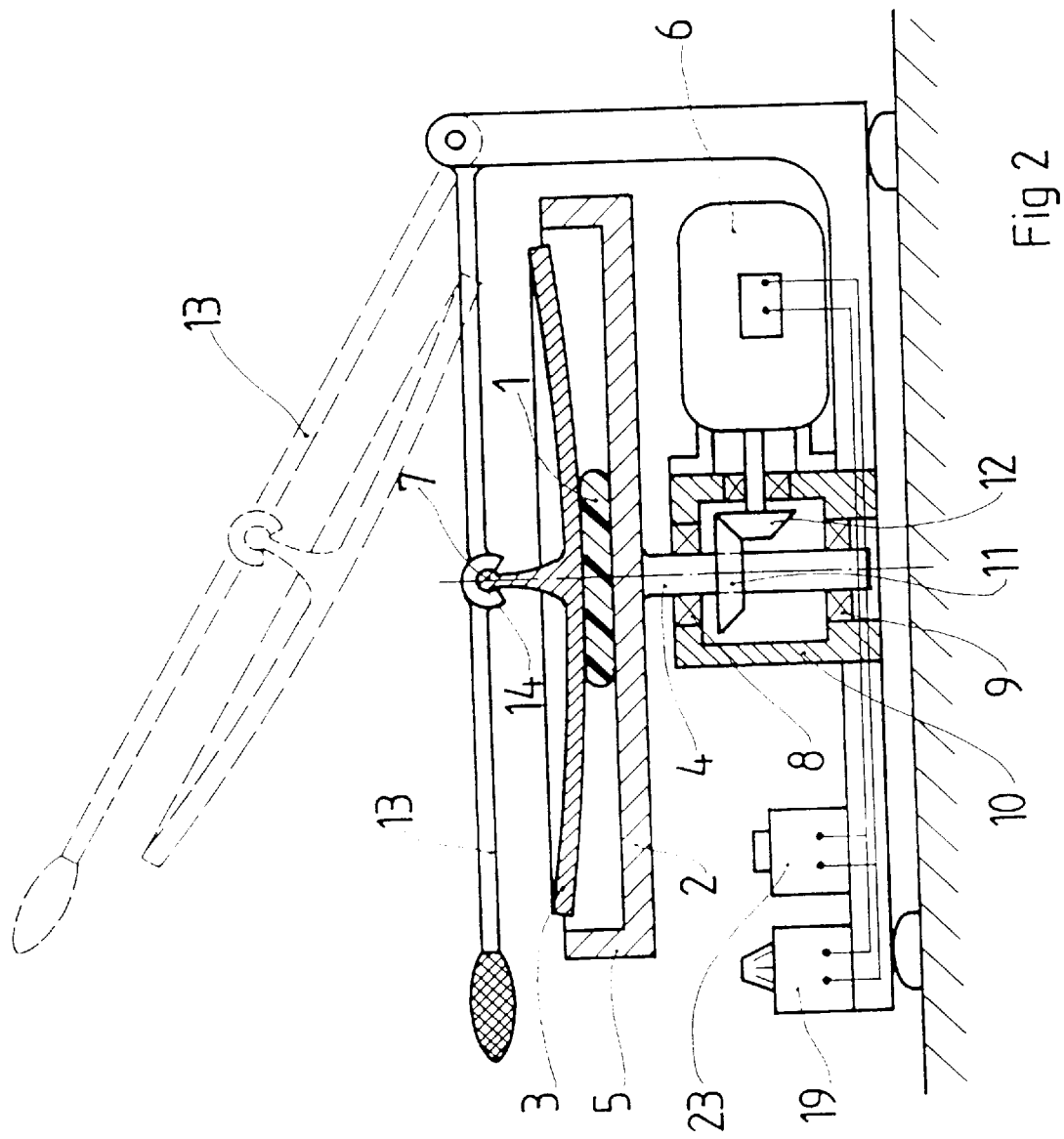
FIG. 2 illustrates an apparatus for realizing the present invention shown simplified in a vertical section.

In FIG. 2, a vertical section is shown schematically and in simplified manner of an apparatus for implementing the inventive method.

The elements shown in the FIG. 2 which correspond to the ones described with reference to the FIG. 1a through 1d are designated with the same reference numbers used therein.

In FIG. 2, the lower plate 2 is held by a vertical axle of rotation 4 supported in bearings 8 and 9 arranged in a housing 10. The housing 10 contains a pair of bevel gears 11 and 12 establishing a drive connection from the motor 6 to the axle 4 and thus with the lower plate 2.

The type of drive train for the axle 4 using bevel gears 11 and 12 is to be considered as a mere example as any other suitable system of transmission of movement, of course, is applicable if desired.

The upper plate 3 is supported in a pivoting lever 13 which is pivotably linked at one end. By means of this lever 13, which represents a preferred design of the support element of the second plate 3, is advantageous because of its simplicity in comparison to other lifting and lowering systems imaginable for the plate 3, the second plate 3 can be moved from a rest position to a working position. The rest position comprises a position wherein the second plate is raised in such a manner that it gives free access to the surface of the lower plate 2, and which in the FIG. 2 is shown with dashed lines. The second plate 3 can be lowered to its lowered working position, which is indicated with solid lines in the FIG. 2, and in which the surfaces of the two plates 2 and 3 are arranged substantially parallel and between them enclose the disk of dough to be "expanded".

According to a preferred embodiment of the present invention, the rotatable support and suspension member 7 of the second rotating plate 3, allows for limited pivoting movement of the latter about the axis of rotation. This freedom is obtained as the support and suspension member 7 is equipped, for example, with a spherical link (compare FIGS. 2 and 3), or according to a further preferred embodiment (not shown) of the present invention is equipped with a pivotable bearing with beveled rolls. Thus, the upper or second plate 3 is permitted during operation to assume an ideal position relative to the first or lower plate 2 as the upper plate 3 can always adapt to possible minor irregularities in thickness present in the preliminary disk of dough 11, and can thus compensate for the effect of such irregularities, thereby ensuring a very regular expansion process of the disk of dough.

Figure 3:
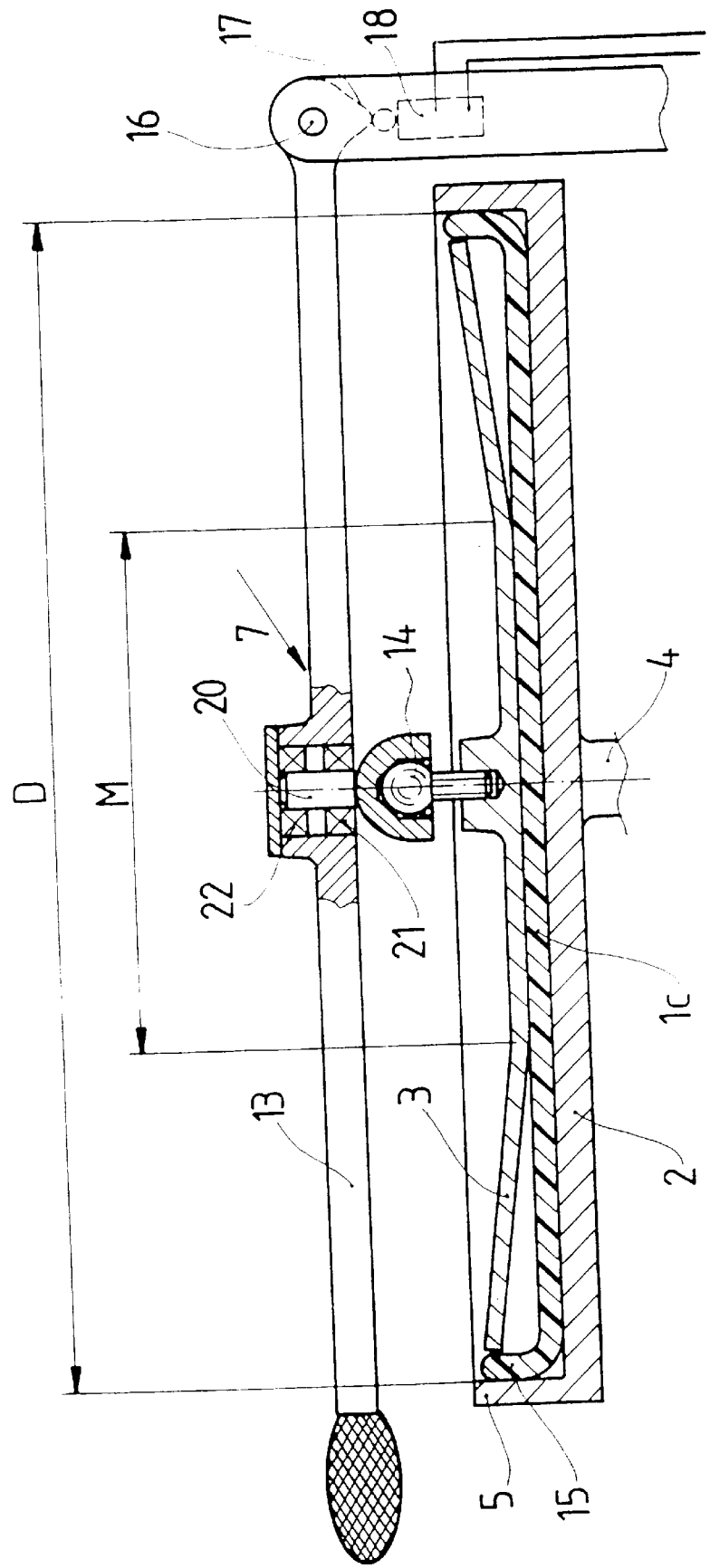
FIG. 3 illustrates the invention in a manner similar to FIG. 1 which is shown enlarged for explaining a number of variations of the invention.

According to a further preferred embodiment of the present invention shown in more detail in FIG. 3, which shows an enlarged detail of FIG. 2, the second plate 3 is provided with a central area in a plane extending at right angles to the axis of rotation, parallel to the first plate 2 and of a diameter M (compare also FIG. 1a) ranging from one third and one half of the diameter D (compare also FIG. 1c) of the first plate 2, and with a ring-shaped peripheral area the distance of the points on which to the first plate increase with their radial distance from the axis of rotation. It is to be stated here that even if preferably the shape of the second plate 3 be varied from the perfectly plane shape for creating the zone which slightly opens towards the outside, no obstacles other than design considerations would preclude that a perfectly planar second plate 3 could be provided and that the ring-shaped outer area of the first plate 2 could be provided with a slight inclination towards the outside and the bottom side in such a manner that the same geometrical conditions as shown in the previous example could be established. It should be remembered that in any case the radial distances mentioned here actually are very small being of the order of millimeters at the edge of the second plate 3.

According to a further preferred embodiment of the present invention shown in FIG. 3, the pivoting point of the lever 13 comprises a cam 17 actuating an electrical switch 18 by which the drive motor 6 can be started, or stopped, respectively, as the lever is lowered to the working position, or is lifted to its rest position, respectively. This embodiment of the present invention facilitates the work of the operator who can start the process by simply lowering the lever 13 to its working position.

According to a further preferred embodiment of the present invention the rotational speed of the drive motor 6 can be adjusted continuously adapting it to the characteristics and to the size of the dough to be processed by means of a control element 19 (FIG. 2) which can be a potentiometer, a variable speed drive, etc., depending on the type motor 6 applied in the apparatus.

A further advantage is obtained if according to a further preferred embodiment proposed the second plate 3 is made from a transparent material, for example, from polycarbonate or polymethyl methacrylate material, such as Plexiglas, or from glass. This proposed solution presents the advantage that the operator visually can inspect the process of expansion of the dough from the beginning and thus can intervene faster whenever required.

According to a preferred embodiment of the present invention the diameter of the plates 2 and 3 ranges from 30 to 50 cm. Diameters in this range presently are used most frequently in the production of pizzas for one person. Another preferred solution provides easy exchange of the first plate 2 as well as of the second plate 3 in such a manner that the diameter of the disk of dough can be adapted rapidly. For this purpose, the rotational axle 4 as well as the rotatable support element 7 are provided with quickly removable connecting elements, such as plug-in connections or similar elements.

In FIG. 3, an example is shown of a quickly removable connection which can be considered for application to the second plate 3. An easily detachable spherical link 14 is shown having a rotational axle 20 which is supported in ball bearings 21 and 22 arranged in the pivoting lever 13.

According to a further preferred embodiment of the present invention, a timer 23 (FIG. 2) can also be provided for setting the duration of the motor rotation phase. If now the operator is to produce a series of pizza dough disks of equal configuration (same diameter, etc.) from balls of dough, or from preliminary disks of dough 11 presenting equal properties (disks which can be prepared previously and can be stored advantageously in an air conditioned environment) he can adjust once and for all the rotational speed of the motor 6 using the control device 19 and the time duration of the rotation phase of the motor 6 using the timer 23. This enables him to work at maximum speed and to produce an increased number of dough disks per unit time, all disks presenting the ideal characteristics described in the introduction.

The present invention is characterized in that it is of utmost simplicity and it is extremely easy to operate which makes it possible to employ in the production of dough disks for pizzas also personnel lacking specific know-how and particular manual skills.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiment, the present invention is not in tended to be limited to the particulars disclosed herein, rather, the present invention extends to all functionally equivalent structures, methods and uses, such as are within the scope of the appended claims.

I claim:

1. Apparatus for producing a disk of pizza dough ready to be topped and baked by application of centrifugal force to the disk of dough, comprising:

a first lower rotatable plate capable of receiving a disk of dough, said first plate being rotatable about an axis of symmetry and forming a fixed portion of a chamber;

a motor adapted to rotate the first plate;

a second plate coaxially arranged with the first plate;

a rotatable and suspending support member arranged on the axis of symmetry of the second plate and rotatably suspending said second plate, said support member being arranged such that as an axial distance between the first plate and the second plate is decreased, the support member moves towards the first plate.

2. The apparatus according to claim 1, wherein said second plate is capable of being set into motion by the disk of dough which is set into motion by said first plate.

3. The apparatus according to claim 1, wherein said support member allows limited lateral pivoting movement of the second disk about a rotational axis.

4. The apparatus according to claim 3, wherein said support member comprises a spherical link member.

5. The apparatus according to claim 3, wherein said support member comprises a pivotable bearing with beveled rolls.

6. The apparatus according to claim 1, wherein said second plate includes a planar central area extending at right angles relative to the axis of symmetry and parallel to said first plate comprising a diameter ranging between one third and one half of the diameter of the first plate, and said second plate includes a circular outer area having an increasing distance from the first plate with increasing radial distance from the axis of symmetry.

7. The apparatus according to claim 1, wherein said support member is attached to a pivoting lever which is pivotable about a pivoting point arranged at one end, said pivoting lever enabling said second plate to be lowered from a rest position, in which said second plate is raised and provides free access to the surface of the first plate, to a lowered working position, in which the surfaces of the two plates are substantially parallel.

8. The apparatus according to claim 7, further comprising an actuating cam associated with said pivoting point, an electrical switch operable by said actuating cam for starting and stopping the motor to rotate said first plate, respectively, as the pivoting lever is lowered into the working position, and is lifted off the working position.

9. The apparatus according to claim 1, wherein said first plate includes a circumference and a rim along said circumference, said rim being angled upwardly in an axial direction towards said second plate, and said rim limiting radial expansion of the disk of dough and forces the dough to rise to form a rim.

10. The apparatus according to claim 1, further comprising a control device capable of continuously varying rotational speed of said motor.

11. The apparatus according to claim 1, wherein said second plate is composed of a transparent material.

12. The apparatus according to claim 1, wherein said first plate and said second plate have diameters ranging from about 30 to 50 cm.

13. The apparatus according to claim 1, further comprising a timer for controlling and pre-setting duration of rotation of the motor.

14. The apparatus according to claim 1, wherein said first and second plates are exchangeable.

15. The apparatus according to claim 1, wherein said first and second plates are exchangeable with variously sized plates to adapt to disks of dough of different sizes.

16. Apparatus for producing a disk of pizza dough ready to be topped and baked by application of centrifugal force to the disk of dough, comprising:

a first rotatable plate capable of receiving a disk of dough;

a motor adapted to rotate the first plate;

a second plate coaxially arranged with the first plate; and a rotatable and suspending support member arranged to rotatably suspend said second plate such that as an axial distance between the first plate and the second plate is decreased, the support member moves towards the first plate.

* * * * *